United States Patent
Herrick et al.

(10) Patent No.: US 6,468,573 B1
(45) Date of Patent: Oct. 22, 2002

(54) PROCESS FOR MAKING REHYDRATABLE FOOD PIECES USING IMPINGEMENT DRYING

(75) Inventors: Marlin G. Herrick; J. Layne Anderson, both of Blackfoot; Gary R. Eversoll, Idaho Falls; Kern L. Cooper, Tetonia; Ronald L. Luedeman, Blackfoot, all of ID (US); Gordon Ching, Modesto, CA (US)

(73) Assignee: Basic American, Inc., San Francisco, CA (US)

( * ) Notice: Subject to any disclaimer, the term of this patent is extended or adjusted under 35 U.S.C. 154(b) by 0 days.

(21) Appl. No.: 09/675,298

(22) Filed: Sep. 29, 2000

(51) Int. Cl.⁷ ................................................ A23B 4/03
(52) U.S. Cl. ...................... 426/445; 426/443; 426/520; 426/637
(58) Field of Search ................................ 426/443, 445, 426/640, 520, 637

(56) References Cited

U.S. PATENT DOCUMENTS

| | | |
|---|---|---|
| 2,705,679 A | 4/1955 | Griffins et al. |
| 3,063,848 A | 11/1962 | Van Gelder |
| 3,338,724 A | 8/1967 | Adler et al. |
| 3,397,993 A | 8/1968 | Strong |
| 3,500,552 A | 3/1970 | Farkas et al. |
| 3,555,992 A | 1/1971 | Fritzberg |
| 3,635,729 A | 1/1972 | Englar et al. |
| 4,310,560 A | 1/1982 | Doster et al. |
| 4,456,624 A | 6/1984 | Glantz et al. |
| 4,473,593 A | 9/1984 | Sturgeon |
| 4,756,916 A | 7/1988 | Dreher et al. |
| 4,761,294 A | 8/1988 | Hamann et al. |
| 4,816,274 A | 3/1989 | Baisden |
| 4,994,295 A | 2/1991 | Holm et al. |
| 5,071,661 A | 12/1991 | Stubbs et al. |
| 5,370,898 A | 12/1994 | Zussman |
| 5,484,616 A * | 1/1996 | Vellucci, Jr. et al. ........ 426/242 |
| 5,492,704 A | 2/1996 | Stubbs et al. |
| 5,500,236 A | 3/1996 | Miller et al. |
| 5,536,522 A | 7/1996 | Seeds et al. |
| 5,603,973 A | 2/1997 | Benson et al. |
| 5,820,909 A | 10/1998 | Hyllstam et al. |
| 5,852,882 A | 12/1998 | Kendall et al. |
| 5,858,431 A | 1/1999 | Wiedersatz |

FOREIGN PATENT DOCUMENTS

| | | |
|---|---|---|
| EP | 0 089 800 A1 | 9/1983 |
| EP | 0 461 718 A1 | 12/1991 |
| FR | 2 689 967 | 10/1993 |
| WO | WO 99/04650 | 2/1999 |

OTHER PUBLICATIONS

Jayaraman, et al., "Preparation of quick cooking dehydrated vegetables by high temperature short time drying," *J. Food Technol.* 17(6):669–678 (1982).

(List continued on next page.)

*Primary Examiner*—Lien Tran
(74) *Attorney, Agent, or Firm*—Dorsey & Whitney LLP; David J. Brezner

(57) ABSTRACT

A method for making dehydrated, shelf-stable, puffed, rapidly-rehydratable, vegetable or fruit food pieces by puffing and drying moist food pieces (e.g. potato shreds) by conveying them in a bed through an impingement drying zone maintained at substantially atmospheric pressure in which streams of pressurized heated gas in a plurality of spaced fluid conduits exit from the conduits in spaced impinging streams at a velocity in excess of about 1,000 feet per minute are directed against the moist food pieces to cause the pieces to be suspended in a fluidized bed. In one case, the heated gas causes the moisture content of the moist food pieces to be reduced rapidly to puff them into porous pieces which exit the impingement drying zone having a moisture content of at least about 4% with a texture and appearance suitable for use as a rehydratable food piece.

34 Claims, 2 Drawing Sheets

PROCESS FLOW SHEET

OTHER PUBLICATIONS

Eisenhardt, et al., "Quick–Cooking Dehydrated Vegetable Pieces, I. Properties of Potato and Carrot Products," *Food Technology* vol. XVI (5):143–146 (1992).

Cording, et al., "Quick–Cooking Dehydrated Vegetable Pieces," *Food Engineering* pp 49–52 (Jun. 1994).

Brown, "Centrifugal Fluidized Bed", *Good Technology* p. 20–30 (Dec. 1972).

Sapers et al., "Flavor Quality in Explosion Puffed Dehydrated Potato. 1. A Gas Chromatographic Method for the Determination of Aldehydes Associated with Flavor Quality," *Journal of Food Science* 35:728–730 (1970).

Cording et al., "Retarding Browning in Explosion–Puffed Potatoes," *Food Engineering* pp. 95–97 (Oct. 1973).

Sullivan et al., "Flavor and Storage Stability of Explosion-Puffed Potatoes: Nonenzymatic Browning," *Journal of Food Science* 39:58–60 (1974).

Sullivan et al., "Continuous Explosion–Puffing of Potatoes," *Journal of Food Science* 42(6):1462, 1470 (1977).

Sullivan et al., "The Development of Explosion Puffing," *Food Technology* pp. 52–53, 55, 131 (Feb. 1984).

Jayaraman et al., "Development of quick–cooking dehydrated pulses by high temperatures short time pneumatic drying." *J. Fd. Technol.* 15:217–226 (1980).

* cited by examiner

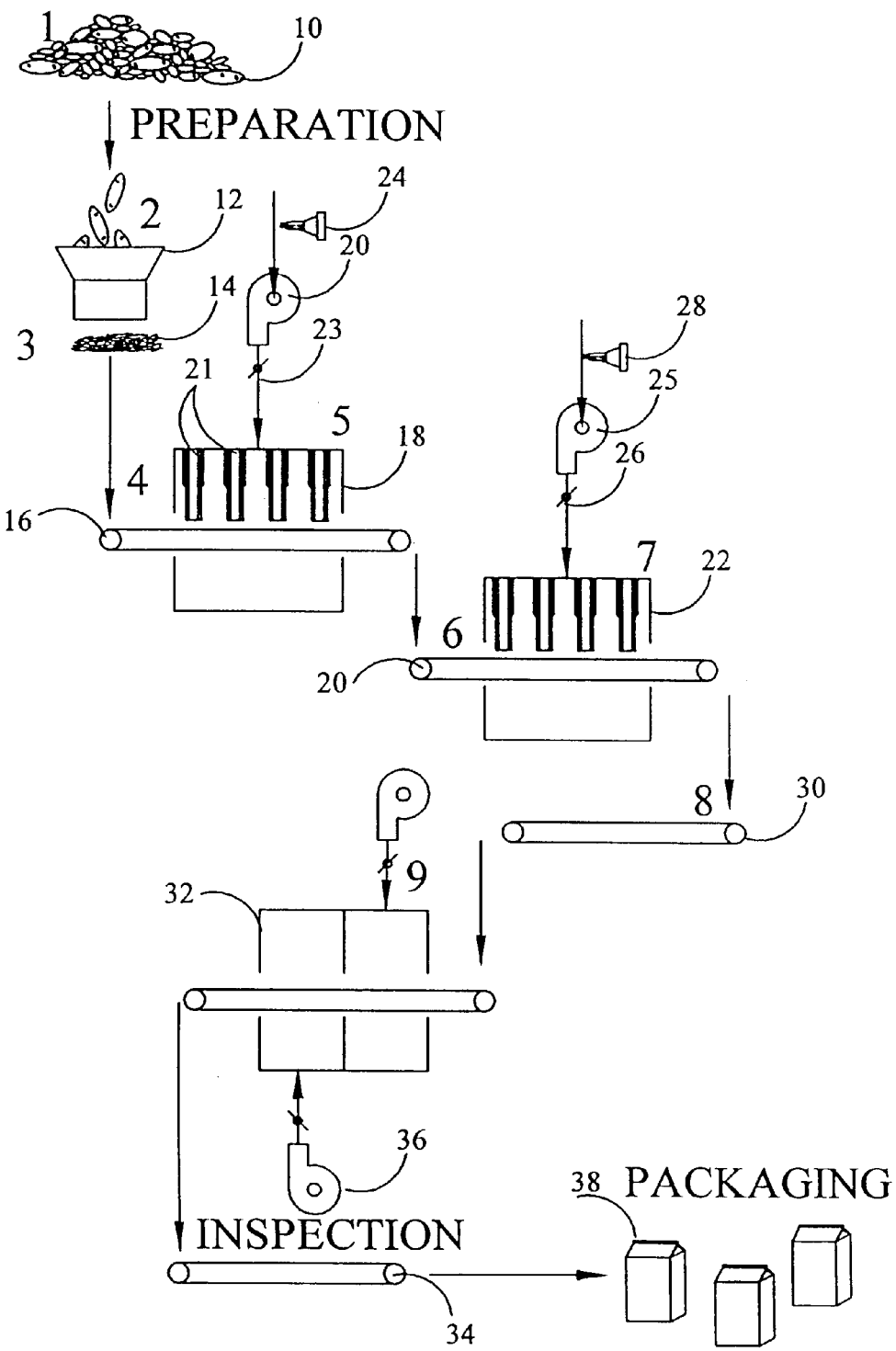
FIGURE 1 - PROCESS FLOW SHEET

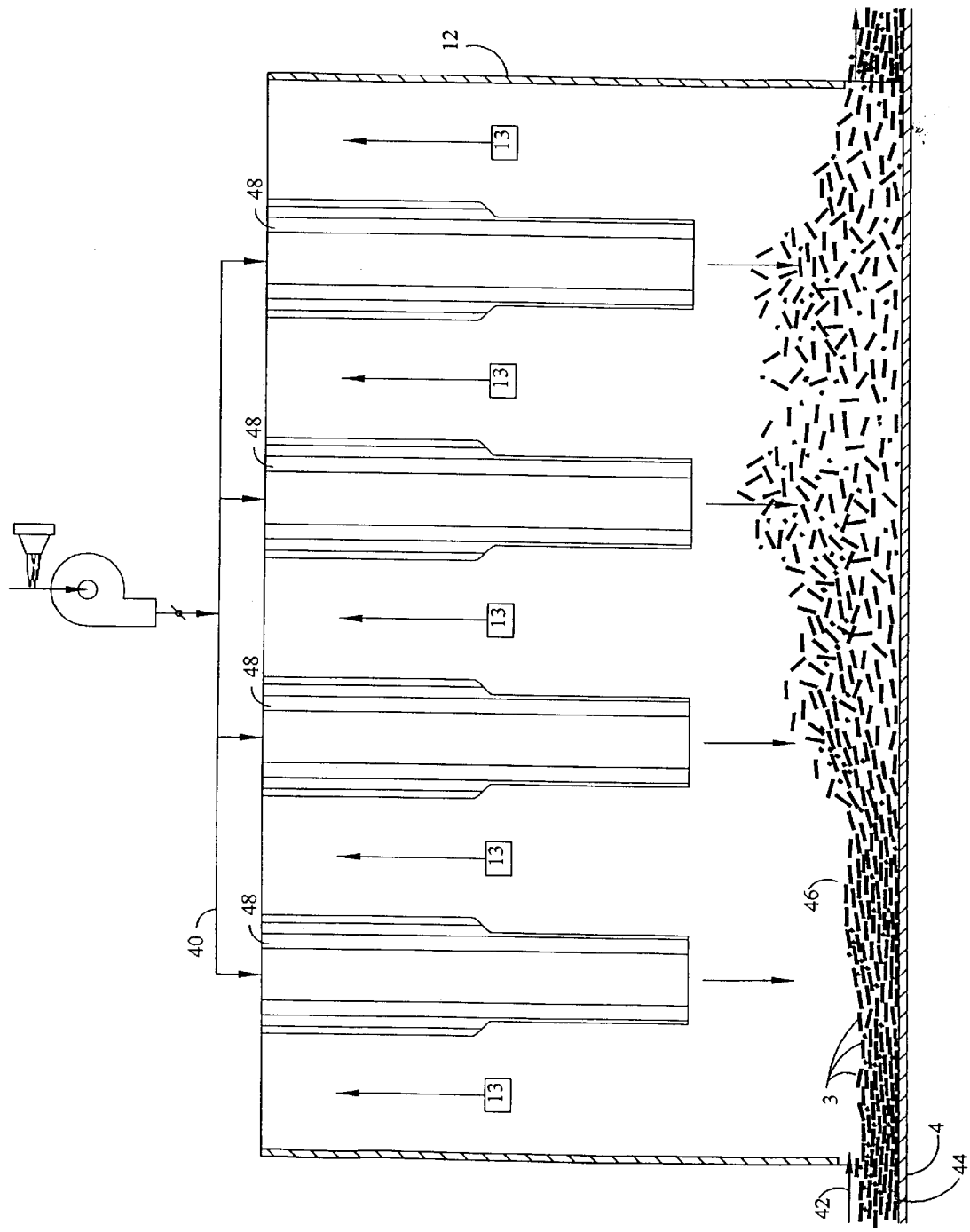
FIGURE 2 - IMPINGEMENT DRYING DETAILS

PROCESS FOR MAKING REHYDRATABLE FOOD PIECES USING IMPINGEMENT DRYING

BACKGROUND OF THE INVENTION

The present invention relates to a method for making shelf-stable, puffed, dehydrated fruit or vegetable pieces, particularly potato pieces, using impingement drying.

Commercially available dehydrated potato pieces typically require a long time to reconstitute to a palatable texture. Such dehydration is typically performed in hot-air continuous belt dryers with relatively low air velocity which require long drying times and produce non-uniform moisture removal and product clustering.

Various approaches have been suggested for making quick-cooking dehydrated vegetable pieces having a porous structure. For example, in Eisenhardt, N. H., et al. "Quick-Cooking Dehydrated Vegetable Pieces I Properties of Potato and Carrot Products", Food Technology Vol. XVI, (5) 143–146, 1962, a method is disclosed for making porous pieces. The pieces are first partially dehydrated in a conventional manner and then heated under pressure in a closed vessel with a quick-opening lid. Then, the pieces are instantly discharged. Flashing of the water vapor within the pieces creates a porous structure. The publication states that when the entering potato pieces have a moisture content above about 53% the pieces disintegrate on instantizing and further states that the optimum moisture range is about 24–53% with optimum puffing pressures from about 30–60 psi depending on the moisture content. Subsequent work by this team and other teams at the USDA Eastern Regional Center used a battery of guns for explosion puffing into a final dryer. (J. Cording, Jr., et al. "Quick-Cooking Dehydrated Vegetable Pieces" Food Engineering, June 1994, 49–52) The publication suggests an optimum moisture content exiting the predrying stage of about 28–35%. Further it suggests a pressure of about 55 psi.

Another theoretical approach to making puffed potato pieces is disclosed in Brown, G. E., "Centrifugal Fluidized Bed" Food Technology, Dec. 23–30, 1972. In this approach dices are predried to about 40% moisture content prior to puffing. The particles rotate in a rotating basket to create centrifugal forces which when opposed by gravitational air velocity forces causes the dices to become fluidized.

Carrot pieces have been puffed commercially in a chamber maintained above atmospheric pressure but below 55 psi. When the chamber pressure is rapidly released, the carrot pieces are puffed.

Griffins et al. U.S. Pat. No. 2,705,679 discloses a method of making a dried snack potato food product by directing upwardly a hot-air stream in a duct at the bottom of a chamber through blanched diced potatoes to form a fluidized bed. The potatoes are puffed and dried to form pieces with a hollow core and a brown outer casing. The pieces rise to the top of the chamber and are removed. There is no suggestion that the dried potato dices could be rehydrated.

Adler et al. U.S. Pat. No. 3,338,724 discloses use of the same apparatus for preparing a dried, quick rehydrating puffed potato product. The process discloses immersing the potato pieces in a blanching solution of 0.1% to 2% sodium chloride solution in water.

Albisser, et al. (PCT Publication WO99/04650) discloses predrying and then puffing potato pieces for use as thin crispy snack food chips. The chips are 1.2–2.3 mm (0.047–0.090") in thickness. This is typical for snack food chips. Albisser dries the chips to about 1% moisture, also typical for crisp potato chips but unsuitable for rehydratable potato pieces. The chips are coated with oil for binding seasoning. Zussman U.S. Pat. No. 5,370,898 also discloses a process for making thin snack food chip products which are predried and then puffed in an impingement dryer. As with Albisser, the Zussman product is a ready to eat, thin snack chip. The final product is a crispy snack chip (typically dried to a moisture content about 1% as set forth in Albisser).

SUMMARY OF THE INVENTION

The present invention relates to a method for making food pieces that are puffed into porous structures during impingement drying.

In particular, the method makes dehydrated, shelf-stable, puffed, vegetable or fruit food pieces, preferably ones that are rapidly rehydratable. The method includes drying moist vegetable or fruit food pieces by conveying them in a bed through an impingement drying zone maintained at substantially atmospheric pressure in which streams of pressurized heated gas in a plurality of spaced fluid conduits exit from the outlets of conduits in spaced impinging streams at a velocity in excess of about 1,000 feet per minute are directed against the moist food pieces and suspending the pieces in a fluidized bed, without applying significant centrifugal forces to the pieces. The pieces exit the impingement drying zone having a moisture content of at least about 5%. Preferably, such products have a texture and appearance suitable for use as a rapidly-rehydratable food piece. In one embodiment, the heated gas causes the moisture content of the moist food pieces to be heated and vaporized to puff them into porous pieces.

In another embodiment, the porous pieces have a moisture content in excess of about 50% (e.g. for potato pieces) on exiting said impingement drying zone. Such pieces may be further dried and packaged at a moisture content above about 4%.

The moist food pieces may be blanched prior to entering said impingement drying zone or in the zone.

BRIEF DESCRIPTION OF THE DRAWINGS

FIG. 1 is a schematic representation of one embodiment of a flow diagram for performing the present invention.

FIG. 2 is a schematic cross-sectional view of potato pieces being processed in an impingement dryer according to the invention.

DETAILED DESCRIPTION OF THE INVENTION

The present invention is directed to a method for making a shelf-stable, puffed, dehydrated vegetable or fruit piece. Suitable vegetable pieces include potatoes, carrots, onions, garlic, sweet potatoes, yams and legumes (such as beans, peas or lentils). Suitable fruit pieces include apples, grapes, peaches, apricots, pears, and tomatoes. Suitable forms of potato pieces include slices, dices, shreds, juliennes, and home fries.

In one embodiment, the food pieces made according to the present invention exclude snack foods, such as potato chips, which (1) have a well known crispy texture and flavor, (2) are typically coated with one or more flavoring compounds such as salt on a layer of oil to provide the binding agent and crispy texture, (3) for potatoes, typically have a browned surface, and (4) typically have a thickness less than about 0.1". In contrast, in this embodiment, the pieces of the present invention do not have a crispy snack food, chip-like texture and appearance.

For simplicity of description, the process of the present invention will first be described with respect to a process in which potato pieces are puffed into rehydratable, dried potato pieces. However, it should be understood that it is also applicable to fruit and other vegetable pieces such as those set forth above.

Prior to impingement drying according to the invention, raw potatoes can be pretreated in a number of conventional ways. For example, the potatoes may be de-rocked, washed, trimmed and peeled. Then, they may be comminuted into pieces of a desired size depending on the end use. The method for comminuting potatoes into sizes and shapes suitable for slices, dices, shreds, juliennes, and home fries are well known in the art. See e.g., Talburt and Smith, "Potato Processing," 4th Edition, pages 625–626. Typically, the potato pieces are cut to a size such that the pieces exiting the impingement drying step have a thickness of at least about 0.08 inch. This corresponds to a typical thickness of the comminuted potato pieces entering the dryer of at least about 0.09 inch to 0.10 inch or more. Such a minimum thickness is more typical of a rehydratable piece in comparison to a crispy snack food chip. Thinner pieces can be used for specific applications such as potato shreds used for hash brown potatoes.

In particular, typical sizes immediately after cutting for potato slices are at least about 0.10 inch thick and preferably from about 0.10 to 0.25 inch thick; for dices at least about 0.19 inch thick and preferably from about 0.19 to 0.5 inch thick; for shreds at least about 0.06 inch thick and preferably at least about 0.09 to 0.10 inch to as high as about 0.20 inch thick or more; for juliennes, at least about 0.06 inch thick and preferably about 0.12 to 0.25 inch thick; and for home fries at least about 0.13 inch thick and preferably about 0.19 to 0.5 inch thick.

The above thicknesses are more typical of rapidly-rehydratable food pieces as contrasted to the thin snack food chips of the prior art. The above sizes are of the moist food pieces prior to drying.

Shreds, due to their shapes, may be sized with thicknesses somewhat greater than the foregoing (e.g., as high as about 0.20 inch thick) and still retain rapidly-rehydratable characteristics. Typical shreds have approximate cut dimensions as follows: Random lengths up to the length of a potato (e.g., 4 inches); width: about 0.1 to 0.4 inch; thickness: about 0.08 to 0.15 inch.

The potato pieces exiting the impingement drying zone to be described hereinafter are cooked and puffed and have a moisture content at least about 4 or 5% or more with a texture and appearance suitable for use as a rehydratable vegetable or fruit piece. The potato pieces may either be precooked prior to feeding into the impingement drying zone or may be cooked in the impingement dryer. The process will first be described with respect to a method in which the pieces are precooked prior to impingement drying.

As used herein, the conditions of "cooking" or "precooking" include heating sufficient for blanching (to inactivate degradative enzymes) and can include additional cooking (for example, for potatoes, cooking until the potato tissue is softened). These cooking conditions can have a significant impact on the finished product, affecting its mouthfeel texture, and appearance, as well as its reconstitution characteristics. Such cooking can be accomplished prior to impingement drying by methods which include immersion in heated water, movement through hot water sprays, or by steam blanching. Such conditions are well recognized in the dehydrated potato industry. For example, see "Potato Processing" 4th Edition, pages 627–630.

If desired for a particular end product, the pieces can be immersed in a solution of seasoning such as salt (sodium chloride) during precooking. Alternatively, if desired, dry seasonings such as salt can also be applied at any convenient location in the process. Concentrations of salt on the pieces after treatment on a bone dry solids basis typically is less than 5% and range from 0% to about 3 to 5%.

An important feature of the present invention is that the food pieces are puffed and partially or fully dried using an impingement drying process. In general terms, the pieces are conveyed through an impingement drying zone in which pressurized heated gas is directed against the entering moist pieces and conveyor belt surfaces under sufficiently high velocity to maintain the pieces as a fluidized bed. Unless otherwise specified, the term "impingement drying zone" collectively refers to one or more zones or chambers of impingement drying either within a single impingement dryer or in a sequential series of impingement dryers.

The impingement drying zone is maintained at a substantially atmospheric pressure. The pressurized heated air flowing through the spaced tubes impinges against the food pieces and conveyor belt to heat the moisture in the interior of the pieces to create an internal pressure in the food pieces. However, the dryer zone is open to the atmosphere, due to equilibration with the surrounding air, and so no significant pressure (e.g., greater than a few psig) is created in the impingement drying zone through which the pieces travel. This is in contrast to the Eisenhardt and Cording work described in the Background of the Invention in which the pieces are subjected to elevated temperature and pressure in a closed chamber. Puffing occurs when pressure is quickly released and moisture flashes off creating a porous internal structure. The pressure conditions maintained in the drying zone of the present invention are similar to the Zussman Patent 5,370,898.

Another condition of impingement drying is that the bed is not subjected to significant centrifugal forces in the impingement drying zone such as would create in a centrifugal fluidized bed as described in the Brown article cited in the Background of the Invention.

One preferred form of impingement dryer zone is sold by Wolverine under the JETZONE fluid bed dryer name. Such dryers include the use of an anti-stick coating such as on food contacting surfaces in the first impingement dryer. In this system, a continuous array of spaced, upright, preferably substantially vertical conduits (tubes) is preferably mounted in the drying zone above and/or below a moving bed of food pieces. High velocity gas (e.g., air) preferably supplied from above the bed (e.g., being transported on a traveling belt or vibrating pan) impinges on and lifts the pieces forming a fluidized bed. Then, the air streams are deflected from the conveying surface and create a cushion of air surrounding and tumbling the pieces to promote fast and uniform drying. The air returns upwardly around the outside of tubes for exit from the drying zone. The return air converges in a manifold and may be passed through a cyclone dust collector.

In an alternative mode of gas contact during impingement drying, heated gas at sufficiently high velocity to maintain the pieces in a fluidized state may be simultaneously directed against the pieces in streams above and below the pieces. This can be performed by positioning impinging gas tubes above and below the pieces which are conveyed, e.g., on a traveling perforated belt or vibrating pan.

Any known method of conveyance of fluidized pieces in the impingement drying zone may be employed. For example, traveling belts or vibrating pans may be used.

The heated gas flowing through the impingement tubes typically has a velocity of at least about 1,000 to 3,000 feet per minute to as high as 5,000 to 6,000 feet per minute or even as high as about 8,000 to 13,000 feet per minute or more exiting the tubes. Under preferred conditions, the gases exit the tubes about 8,000 to 10,000 feet per minute. A sufficient number of spaced tubes is provided to cause impinging streams to impact directly onto the bed of food pieces and/or onto a conveying surface below the food pieces to fluidize the bed. In addition, sufficient spacing between the tubes is provided so that the impinging air streams deflect off the bed and surface in countercurrent streams which flow in the spaces surrounding the conduits out of the drying zone. These countercurrent streams are relatively quiescent compared to the impinging streams, i.e., travel at greatly reduced velocity, e.g., no greater than about 1,000 feet per minute and, typically, less than about 500 feet per minute.

As used herein, the term "open area" refers to the total cross-sectional area of the outlet openings of the conduits (tubes) as a percentage of the total cross-sectional area of the drying zone in a plane perpendicular to gas flow. The open area generally is less than about 30%, more preferably less than about 20%, and optimally less than about 8% to as low as 4% or less.

The high velocity impinging streams and relatively quiescent surrounding area created by the spaced tubes have the advantage of creating a series of turbulent flow regions (to facilitate agitation and uniform fluidization) followed by lower velocity zones (to ensure that pieces are not blown out of the bed and into the recycle air stream).

Preferably, the impinging gas steams are substantially downwardly directed and the exiting countercurrent gas streams are substantially upwardly directed.

The heating conditions depend upon many factors including the thickness of the pieces traveling through the impingement drying zone, the entering moisture content, the exit moisture content and whether the pieces are precooked prior to entering the zone or are cooked in the zone. In that regard, a suitable range of temperatures during puffing in the impingement drying zone is about 300° F. to 350° F. to about 450° F. to 600° F. The time within the zone varies depending upon the starting moisture content, whether or not the total drying for the end product of the pieces occurs in the impingement dryer, the drying gas temperature, the exit product temperature and the piece dimensions.

Typical cooking conditions for the pieces in the impingement drying zone are in a humid air or steam environment suitably at a maximum temperature of about 400° F. to 450° F. for about 1 to 10 minutes, preferably about 2 to 5 minutes, depending on piece size. Because dehydration occurs quickly at such high temperatures and air velocities, drying rates are significantly faster than with the conventional drying using conventional low-velocity hot-air dryers. Fluidizing the bed ensures uniform drying without clustering.

In one embodiment, the pieces are puffed and dried to the desired end moisture content in the impingement dryer. In another embodiment, the pieces are puffed in the impingement dryer and the final drying occurs in a conventional dryer such as a conveyor dryer using low-velocity hot-air and manufactured by such companies as Proctor & Schwartz and National.

In either event, the conditions are selected to produce an end product for packaging with a desired moisture content of at least about 4% to as high as 10%, preferably a moisture content of about 5%–9%. Such end moisture contents are significantly higher than the snack food chip products which are typically substantially below 4%–5% and typically between about 1% and 3% moisture. This difference in drying can provide a significant difference in rehydration characteristics, color, texture, and taste.

For reasons to be explained hereinafter, dehydration preferably occurs in multiple impingement chambers operating at different processing conditions.

Referring to FIG. 1, a schematic representation of a process according to the present invention is illustrated for making potato shreds. Raw potatoes 10 enter the process and are pretreated in a conventional way as represented by the number 12. Such pretreatment may typically include such unit operations as washing, trimming, peeling, comminuting (e.g., shredding), precooking (e.g., blanching) and cooling. The order of these unit operations can be varied depending upon the selected product and process. For a shredding operation, potatoes (such as Russet Burbank potatoes) may be used in which the potato pieces entering the impingement dryer are blanched shreds with an approximate thickness of about 0.09 inch, a width of about 0.20 inch and random lengths up to about 4 inches.

The potato pieces 14 are then distributed in a uniform bed depth, e.g., at a bed thickness of about 0.25 inch to 1 inch across conveyor belt 16 (measured before entering the dryer) which transports the shreds through a first impingement dryer 18. A fan 20 blows air through duct 23 which previously is heated by heater 24 and directed into tubes 21 in impingement drying chamber 18 for fluidizing the bed. The details of the internal operation are illustrated schematically in FIG. 2.

The potato shreds on belt 16 are then dropped onto a second belt 20 on which they are conveyed through a second impingement dryer chamber 22 with its own heater 28, blower 25 and duct 26, typically maintained at different conditions than the first impingement drying zone.

After passage through the second impingement drying chamber 22, the shreds may be transferred by conventional means such as conveyor belt 30 for finish drying to a low-velocity hot-air dryer 32 such as those made by Wolverine, Proctor & Schwartz and National. After finish drying, the pieces may be fed by conveyor 34 to a typical packaging operation 38.

One of the advantages of using multiple impingement drying chambers is the use of different conditions in the two (or more) zones. In general, the chambers 18 and 22 are preferably heated to a higher temperature for a shorter time than chamber 32 because, during the impingement drying stages, the goal is to rapidly dehydrate and puff the pieces. During later stages (e.g., finish drying), the goal is to gently remove moisture with minimal browning.

The impingement drying zone is maintained under temperature and time conditions high enough to accomplish puffing but not so high as to scorch or brown the product. Typically, the temperature in the impingement drying zones is between 300° F. and 600° F., depending on the product, time and gas velocity. Preferable conditions in the first impingement drying zone are: temperature—about 325° F. to 475° F. for about 15 seconds to about 5 minutes at a gas velocity exiting the tubes of about 5,000–13,000 feet per minute. More preferably, the conditions are about 400° F. to 440° F. for about 30 seconds to about 4 minutes and a gas velocity of about 7,000–9,000 feet per minute.

Preferable temperature ranges in a second impingement drying zone are similar to the first impingement drying zone but typically the residence time is slightly longer, e.g., about 1–10 minutes or more. Higher temperatures can be used to reduce the residence time. The total impingement drying time is preferably less than about 15 minutes.

Referring to FIG. 2, a more detailed schematic view of one embodiment of an impingement drying treatment is illustrated. Here, a plenum 40 supplies hot air to a plurality of tubes 48. The potato pieces 42 are conveyed in a bed by conveyor 44 into a piece inlet opening disposed near the bottom of the impingement drying zone. Conveyor 44, in the form of a continuous conveyor belt, transports pieces 42 in a bed 46 through chamber 12 for a controlled retention time. As illustrated, as the pieces move through the drying zone they pass under a plurality of tubes 48 through which high velocity hot gas is forced downwardly against the pieces and conveyor belt. During this process, the pieces become fluidized, facilitating uniform dehydration of the surfaces, puffing of the pieces and minimizing clustering. The gas can be air if the pieces are preblanched or precooked. Alternatively, the gas may be moist air or steam if the embodiment is used in which the pieces are cooked in situ within chamber 12.

For maximum efficiency, the gas is recirculated upwardly as illustrated by arrows 13 followed by cleaning in a cyclone and subsequent heating. Tubes 48 are typically arranged in a staggered pattern to obtain uniform fluidization and minimize the tunneling effect on the product bed. The initial rows of tubes in the first impingement dryer are typically 4–5 inches away from the belt and the rows towards the exit are typically 3–4 inches away from the belt to minimize products sticking on the entrance-end tubes.

In typical operation, pieces exiting the first impingement drying zone are transferred to a second impingement drying zone by a physical drop. This breaks clusters and helps facilitate good fluidization in the second impingement dryer. A suitable distance for the drop is several inches to several feet.

The second impingement dryer is typically operated with the food pieces at a bed depth of about 0.5 inch to 2 inches which is thicker than a typical bed depth of about 0.25 inch to 1 inch in the first dryer before entering the impingement drying zone. This difference in thickness is chosen to minimize equipment size since deeper beds can be utilized as the product dries. The retention time is typically longer in the second impingement drying zone than in the first one to maximize drying efficiency since bed depths can be greater. Suitable conditions in the two drying zones are set out above. The conditions assume that the products will be final dried in a conventional low-velocity hot-air dryer.

Dehydration after puffing can be much slower and conducted by any number of means including impingement drying, low-velocity hot-air, microwave, vacuum, freeze drying and the like. As used herein, the impingement drying zone refers to the one or more impingement drying zones in which the heated gas is directed against the moist pieces to fluidize and puff them.

In a preferred operation, the moist pieces exit the impingement drying zones for potato pieces with a moisture content in excess of about 50% to 60% and as high as 70% depending upon the pieces being dried. For example, for dices, slices, juliennes, pieces with an entering moisture content of about 82% can be dehydrated to a moisture content of 50% to 70%. Shreds typically entering the process at a similar moisture content of about 82% typically exit the impingement drying zone at a moisture in excess of about 40% and preferably from about 50% to 60%.

Water may be sprayed on the pieces before and/or in the impingement drying zone, e.g. in the first half of the impingement drying zone, or sprayed in the second half of the impingement drying zone to minimize stickiness if there is a substantial amount of free starch on the potatoes entering the impingement dryer.

In a preferred embodiment, the moist potato pieces entering the impingement drying zone are not predried to a moisture content lower than about 30%. In that regard, in a preferred process, the potato pieces are not predried.

The pieces exiting the impingement drying zone and ultimately packaged have a texture, appearance and physical characteristics typical of a piece used for a rapidly rehydrated product. In that regard, such packaged pieces have a rehydration ratio of about 3.2 to 5.0 and preferably between about 3.5 and 4.5. The pieces have a relatively creamy or off-white yellowish color in contrast to the somewhat darker golden brown color of a snack food potato chip product. Further, snack potato chips have a toasted appearance and flavor in contrast with the dehydrated food pieces of the present invention which have no such toasted appearance. Similarly, the final pieces of the present invention have minimal caramelized carbohydrate flavors in contrast to such potato chips. For example, the product of the present invention exhibits a low browning level which typically does not exceed about 0.03 to 0.10 ppm 3-methylbutanal equivalence when compared to isobutylacetate using a gas chromatographic headspace analysis of a hot aqueous mixture. For comparison, it is not unusual for snack potato products, such as potato chips, to exhibit significantly higher 3-methylbutanal levels, 0.30 ppm or greater. In contrast to snack food potato chips, the thicker pieces of the present invention typically are not subject to temperatures in excess of about 450° F. for over 15 minutes. Some of the larger pieces may be treated at temperatures of about 250° F. to 350° F. for up to about 20 minutes.

The conditions of final drying after exiting the impingement zone are conventional in the dehydrated potato piece industry. The time and conditions are set to dry the pieces to the desired and moisture content as set forth above.

The above process has been described with respect to preblanching or precooking. However, the product may be fed to the impingement drying zone without precooking or preblanching. In this case, the puffing and blanching or cooking occurs in the dryer itself. This can be accomplished by directing steam or moist air through the impingement drying tubes against the product. In this case, the temperature of the gas and retention time are typically about 400° F. (dry bulb), 140° F. (wet bulb), and 2–20 minutes retention.

In another embodiment useful for producing a puffed product, at least three drying steps are employed. Downstream from the impingement drying first step described above, the porous pieces exiting from the zone are directed in a second drying step in which they are subjected to lower temperature conditions than in the impingement drying zone. Thereafter, in a third drying step, the low temperature-dried pieces are conveyed through a secondary puffing zone maintained at a higher temperature than the low temperature drying step to further puff the porous pieces. Thereafter, the pieces can be finish-dried conventionally, e.g., in a low-velocity, hot-air dryer under conditions to avoid scorching or browning. This three-stage process is particularly applicable to thick pieces such as potato pieces of about 5/16 inch thickness or more to yield a more uniform porous final product. The heating conditions vary depending upon the thickness of the food pieces entering the first step.

Referring to the first impingement drying step, the above conditions may be employed. Suitable air drying temperatures are between about 250° F. and 600° F., preferably about 350° F. to 450° F. for about 2–6 minutes, with an air velocity exiting the tubes of about 7000–11,000 feet per minute. A suitable exit moisture content ranges from about 55%–76% and preferably about 60% to 70%.

In the second step, the porous pieces exiting the impingement drying zone are treated under lower temperatures than in the first step to further dry the pieces and equilibrate their moisture content inside and outside of the food pieces. This serves to control the moisture content, porosity and texture of the pieces, to avoid a too rapid release of moisture in the subsequent secondary puffing step which could explode the pieces. Conventional drying techniques such as using a low-velocity, hot-air dryer or an impingement dryer at low temperature and air velocity may be employed. Typically, drying air conditions are (a) temperatures of about 50 to 150° F. below that of the first step, typically in a range about 140° F. to 220° F., and not above about 270° F., preferably about 150° F. to 190° F., and (b) air velocity of about 250 fpm for about 45 to 75 minutes. The exit moisture content typically is about 45%–75%, preferably about 55%–65%.

In the secondary puffing third step, the porous pieces are again puffed. In one embodiment, puffing is performed under similar conditions to the first step, depending on the entering moisture content. Preferable conditions are about 300° F. to 450° F. for about 0.5 to 1.5 minutes with an air velocity of about 6000 to 10,000 feet per minute. The exit moisture content is about 40% to 60%.

Another way to perform the secondary puffing step is by steam puffing in which the food pieces are subjected to pressurized steam and then the steam pressure is rapidly released. Preferably, the steam is superheated, e.g., up to an additional 200° F. superheat. A suitable way to perform secondary puffing utilizes an FMC 140 steam peeler. The product is introduced into the barrel of a screw conveyor. Air locks are provided so that there is no substantial pressure release as the product is conveyed. At the end of the conveyor, the high steam pressure is suddenly released to atmospheric pressure to cause additional puffing. Suitable conditions are about 260° F. to 425° F., preferably about 325° to 375°, a steam pressure of about 15–40 psig, preferably about 18–25 psig, with a puffing time of about 15–40 seconds, preferably about 20–30 seconds, and an exit moisture content of about 25%–55%, preferably about 40%–50%.

After the above three-stage process, the pieces may be conventionally dried to the desired final drying conditions as described above.

The products of the present impingement drying zone are more suitable as a rehydratable potato piece than those produced by gun puffing. Gun puffing tends to create a high level of scorch while the present process is substantially free of scorching. Gun puffed products also can be sloughed or mushy on rehydration.

The pieces of the present invention need not be seasoned after the impingement drying zone and prior to packing as is required for potato chip snack pieces. Moreover, the pieces are preferably not coated with oil prior to packaging as is typical for potato chips either to provide the desired flavor or to retain flavoring ingredients on the surface of the pieces. Even if the pieces exiting the impingement drying zone are further dried, the end product which is packaged has a moisture content above about 4%, significantly higher than the moisture content of a typical snack potato chip.

The product of the present invention exhibits a low browning level which typically does not exceed about 0.03 ppm 3-methylbutanal equivalence when compared to isobutylacetate using a gas chromatographic headspace analysis of a hot aqueous mixture. For comparison, it is not unusual for snack potato products, such as potato chips, to exhibit significantly higher 3-methylbutanal levels, 0.30 ppm or greater.

The puffed potato pieces of the present invention are particularly effective for use in combination with conventional rehydratable dehydrated mashed potato pieces to form a chunky mashed potato dehydrated product. By conventional dehydrated pieces is meant any potato piece used to form mashed potatoes such as potato granules, potato flakes, potato pieces sold under the POTATO PEARLS® and the like. The pieces made according to the present invention are typically comminuted to a thickness from about ⅛ inch or less to ¼ inch in up to pieces ¼ or larger. These chunks can be prepared by producing potato pieces from peeled potato (e.g., Russet) strips which are finished dried and then ground or crushed into pieces of random geometry. The pieces can then be added at a desired level (e.g., about 2 to 25% by weight) to the conventional dried mashed matrix together with other optional ingredients such as flavoring, coloring, texture enhancers and the like. Such a product can be reconstituted with boiling water on a steam table within 20 or 25 minutes.

It should be noted that the impingement drying method of the present invention is also applicable to the making of a conventional unpuffed dehydrated potato product. Suitable conditions for making such a conventional product are illustrated in Examples 5 and 6.

In the above description, potatoes are described as the vegetable pieces according to the invention. However, it should be understood that the process is applicable to other vegetables such as carrots, sweet potatoes, yams, legumes (such as beans, peas, or lentils), and the like and fruit pieces such as set forth above.

The present invention will be further illustrated by the following examples which are not to be construed as limiting the scope of the invention.

EXAMPLE 1

This example illustrates impingement drying to make a dehydrated puffed potato slice.

1. Russet Potatoes were washed to remove soil and to reduce the microbiological load.
2. Potatoes were then peeled, and cut into ⅛" thick slices in an Urschel OV slicer.
3. Slices were cooked in water for 15 minutes at 190° F. to inactivate enzymes, and cook to a desirable texture.
4. Cooked slices were then cooled in water and sodium bisulfite and monoglycerides were applied.
5. The slices were dried in a commercially-made, single-stage Wolverine JETZONE Dryer Serial Number 9723 using the following conditions:
    a. Tubes: ⅞" diameter
    b. Plenum pressure: 3.5" w.c. (which equates to roughly 9,500 ft/min air velocity exiting the tubes)
    c. Air temperature: 425° F.
    d. Product retention time: 4 minutes
    e. Product bed depth: ¾"
6. Slices were finished dried in a laboratory-scale dryer which simulated conventional low-velocity hot-air dryer conditions. Air temperature was about 150° F., air velocity about 250 ft/min, and final product moisture content was 7%.

Product made by the above process dried in a total time of 200 minutes, as compared to about 270 minutes which is typical for low-velocity conventional hot-air conveyor dryers. The potato moisture content entering the air impingement dryer was 82%, entering the low-velocity hot-air dryer was 70%.

The product was first assessed for undesirable discoloring and whether the pieces were puffed sufficiently. The puffed slices rehydrated to a palatable texture in boiling water after 7–10 minutes; conventionally-processed potato slices required roughly 20 minutes. When conventionally-dried and impingement-puffed slices were reconstituted under similar conditions (15 minutes at simmer), the rehydration ratios were 3.70 and 4.65, respectively, which validated the reconstituted yield benefit with this technology.

EXAMPLE 2

This example illustrates impingement drying to make a dehydrated puffed potato dice.
1. Russet Potatoes were washed to remove soil and to reduce the microbiological load.
2. Potatoes were then peeled and cut into ⅜"×⅜"×⅜" cubed dice using an Urschel Model B dicer.
3. Dices were cooked in water for 20 minutes at 1 90° F. to inactivate enzymes, and cook to a desirable texture.
4. Cooked dices were then cooled in water and sulfite/monoglyceride were applied.
5. The dices were puffed in the dryer of Example 1 using the following conditions:
   a. Tubes: ⅞" diameter
   b. Plenum pressure: 3.0" w.c. (approximately 8,500 ft/min air velocity through the tubes)
   c. Air temperature: 400° F.
   d. Product retention time: 3 minutes
   e. Product bed depth: 1"
6. The dice were finished dried in a laboratory-scale dryer which simulated conventional hot-air dehydration conditions. Air temperature was about 150° F. and final product moisture content was 7%.

Product made by the above process dried in a total time of 300 minutes, as compared to about 390 minutes which is typical for conventional dehydration using low-velocity hot air conveyor dryers.

In this example, dehydrated dice were reconstituted in boiling water. The puffed dices reconstituted to a palatable texture after about 10 minutes of reconstitution time in boiling water (rehydration ratio was 4.4). For comparison, ⅜ dice made by prior (conventional) art require 45 minutes reconstitution time in boiling water (204° F.) to achieve a palatable texture (rehydration ratio is typically 3.6).

EXAMPLE 3

This example illustrates impingement drying to make a dehydrated puffed potato shred.
1. Russet Potatoes were washed to remove soil and to reduce the microbiological load.
2. Potatoes were then peeled and cut into 0.117" thick shreds using an Urschel Model CC slicer.
3. Potatoes were then cooked in water at 185° F.–190° F. for 20 minutes to inactivate enzymes and achieve a desirable texture.
4. Potatoes were then cooled in water.
5. Salt/monoglycerides/dextrose/sulfite/BHT were applied.
6. The shreds were puffed in the dryer of Example 1 using multiple passes with the following conditions:
   Plenum pressure: 2.7" w.c. (approximately 8,500 ft/min air velocity through the tubes)
   Air temperature: 425° F.
   Retention time: 3 minutes
   Product bed depth: ¾"
7. Shreds were finished dried in a laboratory-scale dryer that simulated conventional low-velocity hot-air dehydration. Air temperature was about 150° F., air velocity 250 ft/min., and final product moisture content was 7.0%.

Product made by the above process dried in a total time of 68 minutes, as compared to about 150 minutes, which is typical for conventional dehydration using low-velocity hot-air conveyor dryers.

To evaluate quality and reconstitution performance, dehydrated shreds were reconstituted with hot water (160° F.) in a Gable-top carton without additional heating. Using this reconstitution procedure, shreds made by the above process required 10 minutes reconstitution time to achieve a palatable texture; this compares favorably with conventionally dehydrated shreds which require roughly 30 minutes to achieve a similar palatable texture. This evaluation procedure validated the reconstitution time benefits with this new technology.

To evaluate quality and yield performance, dehydrated shreds were reconstituted with hot water (160° F.) for 30 minutes in a Gable-top carton without additional heating. Using this reconstitution procedure, shreds made by the above process achieved a 4.60 rehydration ratio; this compares favorably with conventionally dehydrated shreds that achieved a 4.2 rehydration ratio. This evaluation procedure validated the reconstituted yield benefit with this new technology.

EXAMPLE 4

This example illustrates impingement drying to make a puffed dehydrated potato product in which the enzymes in the potato are substantially inactivated.
1. Russet Potatoes are washed to remove soil and to reduce the microbiological load.
2. Potatoes are then peeled and cut into 0.117" shreds using a Urschel Model CC slicer.
3. Salt/monoglycerides/dextrose/sulfite/BHT are applied.
4. The shreds are blanched/dried in the commercially made impingement dryer of Example 1. In this case, two-stage operation is simulated by running shreds through the dryer using multiple passes with varied condition.

Stage 1
   Tubes: 1 ⅛" tapered to ⅞" diameter; 28 tubes per tubesheet
   Plenum pressure: 3.0" w.c. (approximately 8,800 ft/min air velocity through the tubes)
   Air temperature: 400° F. (dry bulb); 140° F. (wet bulb)
   Hot water spray temperature: 190° F.
   Product retention time: 5 minutes
   Product bed depth: ¾"

Stage 2
   Plenum pressure: 3.0" w.c. (approximately 8,400 ft/min air velocity through the tubes)
   Air temperature: 300° F.
   Hot water spray temperature: 190° F.

Product retention time: 2 minutes

Product bed depth: 1"

To evaluate quality and reconstitution performance, dehydrated shreds are reconstituted with hot water (160° F.) for 30 minutes in a Gable-top carton. Using this reconstitution procedure, the shreds are expected to reconstitute to a similar palatable texture as conventionally dehydrated.

EXAMPLE 5

This example illustrates impingement drying to make a dehydrated potato slice which is not substantially puffed.
1. Russet Potatoes were washed to remove soil and to reduce the microbiological load.
2. Potatoes were then peeled and cut into 1/8" thick slices using an Urschel OV slicer.
3. Slices were cooked in water for 4–5 minutes at 185° F. to inactivate enzymes, and cook to a desirable texture.
4. Cooked slices were then cooled in water and sodium bisulfite and monoglycerides were applied.
5. The slices were dried in a commercially-made, one-stage Wolverine JETZONE Dryer (Serial Number 9723). Multi-stage operation was simulated by sending product through this dryer in multiple passes at different conditions. The following conditions were:

Stage 1
  a. Tubes: 7/8" diameter
  b. Plenum pressure: 3.5" w.c. (approximately 9,000 ft/min exiting the tubes)
  c. Air temperature: 300° F.
  d. Product retention time: 5 minutes
  e. Product bed depth: 1"

Stage 2
  a. Tubes: 7/8" diameter
  b. Plenum pressure: 3.0" w.c. (approximately 7,500 ft/min exiting the tubes)
  c. Air temperature: 175° F.
  d. Product retention time: 55 minutes
  e. Product bed depth: 1"

Product made by the above process dried to a final moisture content of 7% in a total time of 60 minutes, as compared to about 270 minutes which is typical for conventional dehydration.

The slices rehydrated to a palatable texture in boiling water after 20 minutes. When conventionally dried and impingement dried slices were reconstituted under similar conditions (20 minutes at simmer), the respective rehydration ratios were comparable.

These results indicate that this air impingement technology can be utilized (by operating at lower temperatures) to manufacture slices with reconstitution properties similar to conventionally dehydrated potatoes. However, the benefits of quicker dehydration rates and reduced clusters are maintained.

EXAMPLE 6

This example illustrates impingement drying to make a dehydrated potato shred which is not substantially puffed.
1 Russet Potatoes were washed to remove soil and to reduce the microbiological load.
2. Potatoes were then peeled and cut into 0.117" thick shreds using an Urschel Model CC slicer.
3. Potatoes were then cooked in water at 185° F.–190° F. for 20 minutes to inactivate enzymes and achieve a desirable texture.
4. Potatoes were then cooled in water.
5. Salt/monoglycerides/dextrose/sulfite/BHT were applied.
6. The shreds were treated in a commercially made, single-stage Wolverine JETZONE Dryer (Serial Number 9723), in this case, two-stage operation was simulated by running shreds through the dryer using multiple passes with varied conditions.

Stage 1
  Tubes: 7/8" diameter
  Plenum pressure: 3.0" w.c. (approximately 8,000 ft/min air velocity through the tubes)
  Air temperature: 200° F.
  Product retention time: 10 minutes
  Product bed depth: 3/4"

Stage 2
  Tubes: 7/8" diameter
  Plenum pressure: 3.5" w.c. (approximately 8,300 ft/min air velocity through the tubes)
  Air temperature: 175° F.
  Product retention time: 10 minutes
  Product bed depth: 1 1/2".

Product made by the above process dried in a total time of 20 minutes, as compared to about 150 minutes which is typical for conventional dehydration using low-velocity hot-air conveyor dryers.

To evaluate quality and reconstitution performance, dehydrated shreds were reconstituted with hot water (160° F.) for 30 minutes in a Gable-top carton without additional heating. Using this reconstitution procedure, the shreds reconstituted to a similar palatable texture as conventionally dehydrated. This evaluation procedure validated the rapid drying time benefits with this new technology.

EXAMPLE 7

1. Russet Potatoes were washed to remove soil and to reduce the microbiological load.
2. Potatoes were then peeled and cut into 3/8"×3/8"×3/8" dice using a Urschel Model B dicer.
3. Dices were cooked in water for 22 minutes at 195° F. to inactivate enzymes, and cook to a desirable texture.
4. Cooked dices were then cooled in water and monoglycerides/sulfite/BHT were applied.
5. The dices were puffed in the dryer of Example 1 using the following conditions:

Tubes: 7/8" diameter
  Plenum pressure: 3.5" w.c. (approx. 9600 ft./minute air velocity through the tubes)
  Air temperature: 350° F.
  Product retention time: 10 minutes
  Product bed depth: 3/4"

The dices were then partially dried in a laboratory-scale dryer that simulated conventional low-velocity hot-air dryer conditions. Air temperature was about 170° F. for 1 hour, air velocity about 250 ft/min, and outgoing product moisture content of 46%.

6. The dices were then subjected to an additional puffing step which exposed the dice for 25 seconds to 21 psig steam at 350° F. followed by immediate steam pressure release.
7. The dices were finished dried in a laboratory-scale dryer that simulated conventional low-velocity hot-air dryer conditions. Air temperature was 150° F., air velocity about 250 ft/min, and final product moisture content of 7%.

To evaluate quality and yield performance, dehydrated dices were reconstituted with hot water (190° F.) for 30 minutes in a Gable-top carton. Using this reconstitution procedure, dices made by the above process achieved a 5.01 rehydration ratio while dices having only the first treatment above achieved a 4.56 rehydration ratio.

EXAMPLE 8

Application: Puffing Diced Carrots (From Raw)

Steps

1. Washed, prepped, diced, blanched, and starch-treated carrot dice were prepared using the following process:
   a. Receive whole, raw carrots (CVC-14 or other available varieties).
   b. Wash to remove dirt.
   c. Sort to remove defects and foreign material.
   d. Steam peel to remove skin (using 200 psig steam for approximately 12 to 20 seconds).
   e. Dice using Urschel or FAM dicer to either 1/16"×3/8"×3/8" or 1/4"×1/4"×1/4" cut.
   f. Blanch in steam blancher using (4–5 psig steam for approximately 45 to 60 seconds).
   g. Spray-treat with 3.6% food starch/water solution.
2. ~1 lb. of prepped carrot dices (1/4"×1/4"×1/4" or 1/16"×3/8"×3/8" cuts) were placed into the dryer sample pan of a batch-type Wolverine laboratory dryer. These carrot dices have a raw total solids of 14%.
3. The Wolverine dryer using parameters shown in table below were used to produce a puffed product.

| Feedstock | Wolverine Dryer Temperature, ° F. | Wolverine Dryer Residence Time | Inches Water Column Plenum Pressure |
|---|---|---|---|
| Carrot Dice 1/16 × 3/8 × 3/8 | 300° to 325° | 6 to 11 min | 3.5° |
| Carrot Dice 1/4 × 1/4 × 1/4 | 310° to 325° | 8 to 10 min | 3.5° |

Notes
1. Product bed depth~=1.5".
2. Used 3/4" diameter tubes in Wolverine Rotary Batch Unit.
4. The samples were finish-dried in the lab tray dryer at 125° F. until dry (≦5% moisture).

Quality and reconstitution performances were then evaluated. The finished product exhibited a highly-puffed (pillowed) uniform appearance with excellent, deep uniform orange color. The product exhibited a significantly higher bulk index and faster time comparted to current conventionally processed commercial steam-puffed carrots.

Bulk Index Comparison: (Units=ml/100 g)

| Dice Size | Bulk Index (Wolverine-Puffed) | Bulk Index (Current Process) |
|---|---|---|
| 1/16 × 3/8 × 3/8 | ~380 | ~300 |
| 1/4 × 1/4 × 1/4 | ~380 | ~300 |

EXAMPLE 9

Application: Puffing Diced Carrots (From Pre-Dried Carrots)

Steps

1. Washed, prepped, diced, blanched, starch-treated, and pre-dried carrot dices were prepared using the following plant process:
   a. Receive whole, raw carrots (CVC-14 or other available varieties)
   b. Wash to remove dirt
   c. Sort to remove defects and foreign material
   d. Steam peel to remove skin (using 200 psig steam for approximately 12 to 20 seconds)
   e. Dice using Urschel or FAM dicer to 1/16"×3/8"×3/8" cut
   f. Blanch in steam blancher (using 4–5 psig steam for approximately 45 to 60 seconds)
   g. Spray-treat with 3.6% food starch/water solution
   h. Pre-dry in a continuous production belt conveyor dryer to 14% to 20% moisture.
2. ~0.5 lb of prepped carrot dices (1/16"×3/8"×3/8" cut) were placed into the dryer sample pan of the Wolverine dryer of Example 7.
   These carrot dices have a raw total solids of ~14%.
3. The Wolverine dryer using parameters shown in the following table were used to obtain a puffed product.

| Feedstock | Wolverine Dryer Temperature, ° F. | Wolverine Dryer Residence Time | Inches Water Column Plenum Pressure |
|---|---|---|---|
| Carrot Dice 1/16 × 3/8 × 3/8 | 300° to 325° | ~60 seconds | 4° |

Notes
1. Product bed depth~=1".
2. Used 3/4" diameter tubes in Wolverine Rotary Bach Unit.
4. The samples were finished-dried in a tray dryer at 125° F. until dry (≦5% moisture).

Finished product exhibited a highly-puffed (pillowed) uniform appearance with excellent, deep uniform orange color. The product has a significantly higher bulk index than conventionally processed commercial steam-puffed carrots, which results in a quicker rehydrating time. Typical applications include quick-rehydrating foods such as cup-of-noodles.

Bulk Index Comparison: (Units=ml/100 g)

| Dice Size | Bulk Index (Puffed) | Bulk Index (Conventional Process) |
|---|---|---|
| 1/16 × 3/8 × /38 | ~380 | ~300 |

What is claimed is:

1. A method for making shelf-stable, dehydrated vegetable or fruit food pieces, said method comprising drying moist vegetable or fruit food pieces with a thickness of at least about 0.09 inch by continuously conveying them in a bed through an impingement drying zone maintained at substantially atmospheric pressure in which streams of pressurized heated gas in a plurality of spaced fluid conduits having outlets exit from the outlets of said conduits in spaced impinging streams at a velocity in excess of about 3,000 feet per minute and are directed against said food pieces, suspending said food pieces in a fluidized bed, said heated gas causing the moisture content of said moist food pieces to be reduced to a level of at least about 4%, said dried food pieces, if subjected to further dehydration but not to a level below a moisture content of about 4%, being rehydratable in hot water to food pieces with a palatable texture.

2. The method of claim 1 in which said moisture in the moist food pieces is heated and vaporized to cause said food pieces to be puffed into porous structures.

3. The method of claim 2 further comprising further treating the porous pieces exiting from said impingement drying zone to lower temperature conditions in a lower-temperature drying zone having a temperature lower than that in said impingement drying zone to further dry or equilibrate the moisture content of the pieces and then conveying said lower temperature-further dried porous pieces through a secondary impingement drying puffing zone maintained at a higher temperature than said lower temperature.

4. The method of claim 3 in which the puffing in said secondary puffing zone is accomplished by subjecting said food pieces to pressurized steam and then releasing said steam pressure at a rate to cause further puffing.

5. The method of claim 4 in which the pressurized steam is superheated.

6. The method of claim 1 in which said food pieces have a moisture content in excess of about 50% on exiting said impingement drying zone.

7. The method of claim 6 in which said food pieces exiting said impingement drying zone are further dried to produce food pieces and packaged at a moisture content above about 4%.

8. The method of claim 7 in which said dried food pieces are not seasoned after impingement drying and prior to packaging.

9. The method of claim 7 in which said dried product food pieces are not coated with oil after drying and prior to packaging.

10. The method of claim 1 in which said moist food pieces entering said impingement drying zone are not predried to a moisture content lower than about 30%.

11. The method of claim 1 in which said moist food pieces entering said impingement drying zone have a moisture content in excess of about 40%.

12. The method of claim 1 in which said moist food pieces are blanched prior to entering said impingement drying zone.

13. The method of claim 1 in which said food pieces are vegetables selected from the group consisting of potatoes, carrots, sweet potatoes, yams, legumes, corn, onions and garlic.

14. The method as claim 1 in which said food pieces are fruits selected from the group consisting of apples, grapes, peaches, apricots, pears, peppers and tomatoes.

15. The method of claim 1 in which said food pieces comprise potatoes.

16. The method of claim 15 in which said potato food pieces are selected from the group consisting of slices, dices, shreds, juliennes, and home fries.

17. The method of claim 1 in which said food pieces are subject to temperatures in excess of about 300° F. for a time less than about 15 minutes in said impingement drying zone.

18. The method of claim 15 in which said potato food pieces comprise potato shreds.

19. The method of claim 1 in which said gas is steam or humid air and said food pieces are blanched in said impingement zone.

20. The method of claim 1 in which said food pieces have a thickness of at least about 0.1 in. entering said impingement drying zone.

21. The method of claim 1 further comprising spraying water on the pieces prior to or in the impingement drying zone.

22. The method of claim 1 in which said water is sprayed only in the first half of impingement drying zone.

23. The method of claim 1 in which said water is sprayed only in the second half of the impingement drying zone.

24. The method of claim 1 in which said food pieces are not soaked in a salt solution prior to said impingement drying zone.

25. The method of claim 1 in which said impinging streams are directed against said food pieces bed and against a solid surface below said bed to deflect off the same to thereby form countercurrent streams which flow in the space between said impinging streams countercurrently thereto.

26. The method of claim 1 in which at least some of said impinging gas streams are downwardly directed against said food pieces bed.

27. The method of claim 20 in which at least some of said impinging gas streams are upwardly directed.

28. The method of claim 1 in which the outlet open area is less than about 50%.

29. The method of claim 1 in which said velocity is in excess of about 5,000 feet per minute.

30. The method of claim 2 in which said puffed potato pieces are comminuted and mixed with conventional rehydratable dehydrated mashed potato pieces to form a dehydrated chunky mashed potato product.

31. A method for making shelf-stable, dehydrated potato shreds, said method comprising drying moist potato shreds by continuously conveying them in a bed through an impingement drying zone maintained at substantially atmospheric pressure in which streams of pressurized heated gas in a plurality of spaced fluid conduits having outlets exit from the outlets of said conduits in spaced impinging streams at a velocity in excess of about 3,000 feet per minute and are directed against said potato shreds, suspending said potato shreds in a fluidized bed, said heated gas causing the moisture content of said moist potato shreds to be reduced to a level of at least about 4%, said dried potato shreds, if subjected to further dehydration but not to a level below a moisture content of about 4%, being rehydratable in hot water to potato shreds with a palatable texture.

32. The method of claim 7 in which the moisture content of the packaged food pieces is less than 10%.

33. The method of claim 7 in which said packaged food pieces are unfried.

34. The method of claim 31 in which said shreds have a thickness of at least about 0.09 inches.

* * * * *